Feb. 10, 1942.  E. A. EDWARDS  2,272,240

THERMOMETER

Filed Nov. 16, 1940

INVENTOR.

EVAN A. EDWARDS

BY D. Clyde Jones

ATTORNEY.

Patented Feb. 10, 1942

2,272,240

UNITED STATES PATENT OFFICE 2,272,240

THERMOMETER

Evan A. Edwards, Rochester, N. Y., assignor to Taylor Instrument Companies, Rochester, N. Y., a corporation of New York Application November 16, 1940, Serial No. 365,998

6 Claims. (Cl. 73—374)

This invention relates to thermometers.

It is an object of this invention to provide a thermometer having a one piece case, thereby obviating the need for a separate top or front.

It is also an object of this invention to provide a thermometer including a case of one piece construction and having an improved mounting means therein for the transparent cover plate, whereby the cover plate is maintained in substantially moisture-proof and dust-tight relation within the case.

It is a further object of the invention to provide a thermometer including a thermometer case of one piece construction in which the transparent cover plate is mounted in such a manner that it is resiliently retained in position within the case and will not rattle or shatter when mounted on machinery which has a tendency to vibrate.

It is also an object of this invention to provide an improved thermometer which is neat in appearance and compact in construction.

Figure 1:
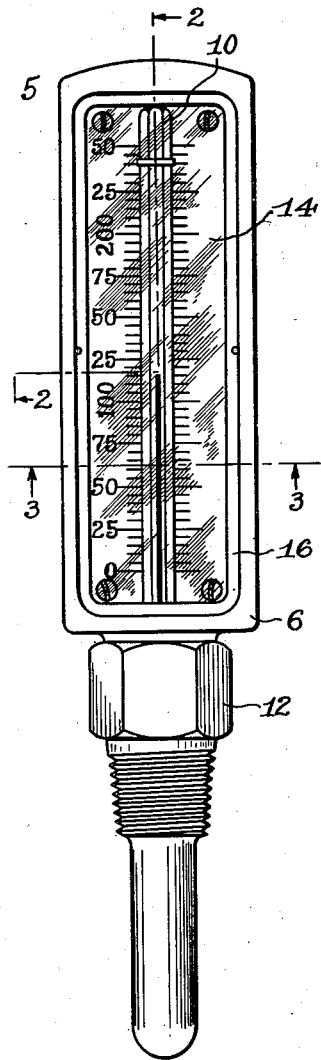
Figure 2:
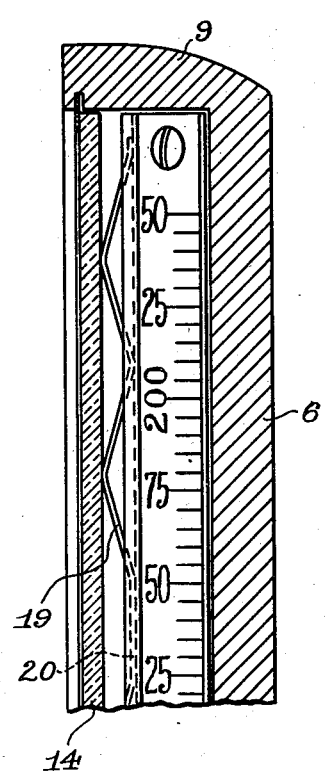
Figure 4:
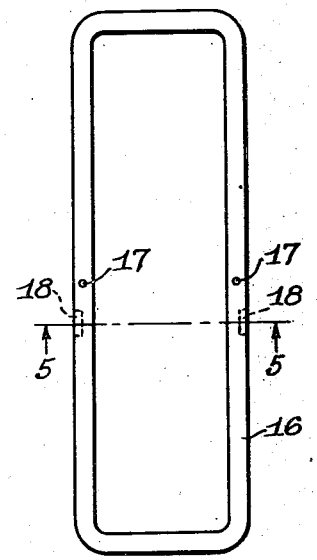
Figure 5:
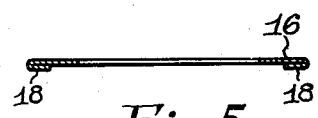
Figure 3:
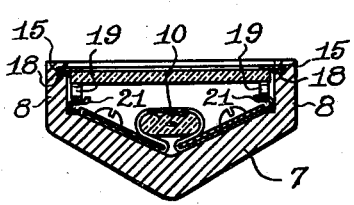
Figures 6, 7:
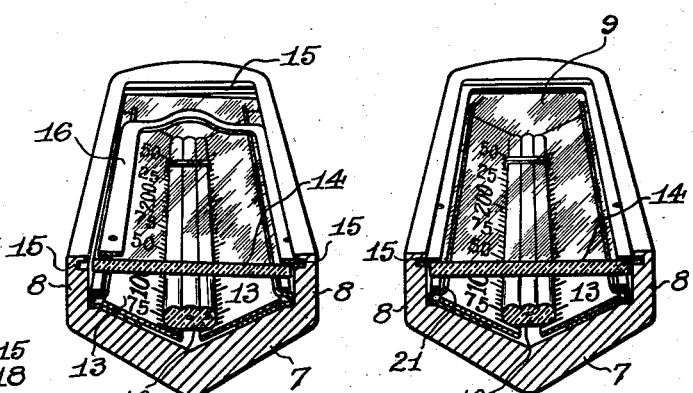

These and other objects of the invention will appear from the detailed description and claims, when taken with the drawing in which Fig. 1 is a face view of a thermometer made in accordance with the present invention; Fig. 2 is a partial vertical section taken substantially on the line 2—2 of Fig. 1; Fig. 3 is a transverse section taken substantially on the line 3—3 of Fig. 1; Fig. 4 is a plan view of an open frame or bezel forming a part of the present invention; Fig. 5 is a transverse section taken on the line 5—5 of Fig. 4; Fig. 6 is a view of the thermometer broken away along the line 3—3 of Fig. 1 and showing the first step in fitting the bezel to the case; and Fig. 7 is a view similar to Fig. 6 illustrating the final step in fitting the bezel to the case.

Referring to the drawing, the thermometer generally indicated at 5 comprises a one-piece case 6, preferably made of die-cast metal, although it will be understood that it may be made of molded rubber or plastics if desired. The case 6 is trough shaped, as shown particularly in Figs. 2, 3, 6 and 7 providing a V-shaped back 7, side walls 8 and end walls 9. A thermometer tube 10 secured in the center of the V-shaped back 7 extends through an opening in the lower end wall 9 (see Fig. 1) into the fittings 12 by means of which the thermometer is mounted in suitable complementary fittings. Suitably graduated scale plates 13 are secured to the back 7 at each side of the thermometer tube 10. The front of the case 6 is closed by a transparent cover plate 14, detachably and resiliently clamped within the case in a manner to be presently described.

By reference to Figs. 2, 3, 6 and 7 it will be noted that the side and end walls 8 and 9 of the case 6 are provided with a continuous groove 15, which preferably extends completely around the inner surface of the case. This groove receives the margin of the open rectangular frame or bezel 16 (Figs. 4 and 5) which serves to lock the glass or cover plate 14 in the case 6. The bezel 16 is preferably made of thin, resilient sheet metal and is provided with openings 17 and depending lugs or plates 18 fixed to its under surface. The depending lugs 18 engage the edge of the transparent cover plate when the thermometer is assembled, as shown particularly in Fig. 3, to latch the bezel 16 in place. The openings 17 are engageable by a tool to aid in springing the bezel 16 out of the groove 15 when disassembling the thermometer.

Referring again to Figs. 2 and 3, it will be noted that elongated zigzag springs 19 are mounted along the side walls 8 of the case, preferably being spot welded at their centers 20 to the horizontal flanges 21 of the scale plate supporting members. The cover plate 14 rests on the crests of these zigzag springs, as shown in Fig. 2, the springs being of such height as to normally maintain the cover plate slightly above the continuous groove 15. Thus, when the bezel 16 is seated in the groove 15 to lock the cover plate in position, the springs 19 will be compressed slightly thereby resiliently clamping the cover plate between these springs and the inner margin of the bezel (see Fig. 3).

The outside dimensions of the bezel 16 are greater than interior dimensions of the open front of the case so that the bezel, when applied to the case, will seat in the groove 15 but the inner dimensions of the bezel are such that its margin will overlie the edge of the glass cover plate.

In assembling the thermometer, the glass cover plate 14, which is slightly smaller than the interior dimensions of the open front of the case, is placed within the case so that it rests on the crests of the zigzag springs 19. The cover plate is then pressed down to compress the springs 19 and to expose the continuous groove 15. Then the bezel is compressed transversely to arch the narrow end in the manner shown in Fig. 6, so that the opposite sides of the bezel adjacent the compressed end may be alined with the groove 15. On releasing the compressive force the sides adjacent this end of the bezel will seat in the groove 15 and it is only necessary to slide the bezel along the case until the end of the bezel is seated in the portion of the groove in the end wall 9. This same operation is repeated at the other end of the bezel, the long sides of the bezel being bowed outwardly (Fig. 6). When both ends of the bezel have been properly positioned in the case it is only necessary to slide the long sides of the bezel into the groove 15 in the manner shown at the left in Fig. 7. It will be understood that the bezel or frame 16 is very light and can be flexed readily to allow it to be inserted in the manner described.

In order to remove the cover plate it is only necessary to reverse the operation just described, the long sides of the bezel being forced inwardly by means of tools engaging openings 17 to release the bezel sides from engaging with the groove 15. It will be understood that the glass cover plate will be depressed below the level of the groove 15 in order that the depending lugs 18 on the bezel may clear the cover plate in removing the bezel from the case.

I claim:

1. A thermometer comprising a case having a back and side and end walls, the inner surface of said side and end walls having groove portions therein, a transparent cover plate for approximately closing the front of said case and receivable within said side and end walls, and a continuous, angular, open frame of flexible material received in said groove portions, a portion of said frame overlying the margin of said cover plate to retain the same in said case.

2. A thermometer comprising a trough-shaped rectangular case having a back and side and end walls, the inner surface of said side and end walls having a groove therein, a transparent cover plate for approximately closing the front of said case and receivable within said side and end walls, and a continuous open rectangular frame made of flexible sheet material, the outside dimensions of said frame being greater than the spacing between the inner surfaces of said side and end walls, the interior dimensions of said open frame being less than the spacing between the interior surfaces of said side and end walls whereby the outer margin of said frame is receivable in said groove and the inner margin of said frame will overlie the margin of said cover plate to retain the same in said case.

3. A thermometer comprising a trough-shaped case having a back and side and end walls, the inner surface of said side and end walls having a continuous groove therein, springs supported within said case adjacent said groove, a cover plate resiliently supported within said case by said springs, and a continuous open frame of flexible sheet material seated in said groove and overlying the margin of said cover plate.

4. A thermometer comprising a trough-shaped case having a back and side and end walls, the inner surface of said side and end walls having a continuous groove therein, springs supported within said case adjacent said groove, a cover plate resiliently supported within said case by said springs, a continuous open rectangular frame of flexible material seated in said groove and overlying the margin of said cover plate, and at least one depending lug on the lower surface of said frame adapted to engage an edge of said cover plate.

5. A thermometer comprising a trough-shaped case having a back and side and end walls, the inner surface of said side and end walls having a continuous groove therein, springs supported within said case, a cover plate resiliently supported within said case by said springs, a continuous open rectangular frame of flexible material seated in said groove and overlying the margin of said cover plate, depending lugs on the lower surface of said frame adapted to engage the edges of said cover plate, said frame adjacent the inner margin thereof being provided with means whereby the frame can be disengaged from said groove.

6. A thermometer comprising a trough-shaped case having a back and side and end walls, the inner surface of said side and end walls having a continuous groove therein, a cover plate supported within said case, a continuous open rectangular frame of flexible material seated in said groove and engaging the margin of said cover plate, depending lugs on the inner surface of said frame adapted to engage the edges of said cover plate, said frame adjacent the inner margin thereof being provided with means enabling the frame to be disengaged from said groove.

EVAN A. EDWARDS.